Jan. 30, 1968   G. S. JEWELL ET AL   3,366,857
CO-ORDINATE DRIVE LINE TRACER
Filed April 27, 1964   8 Sheets-Sheet 5

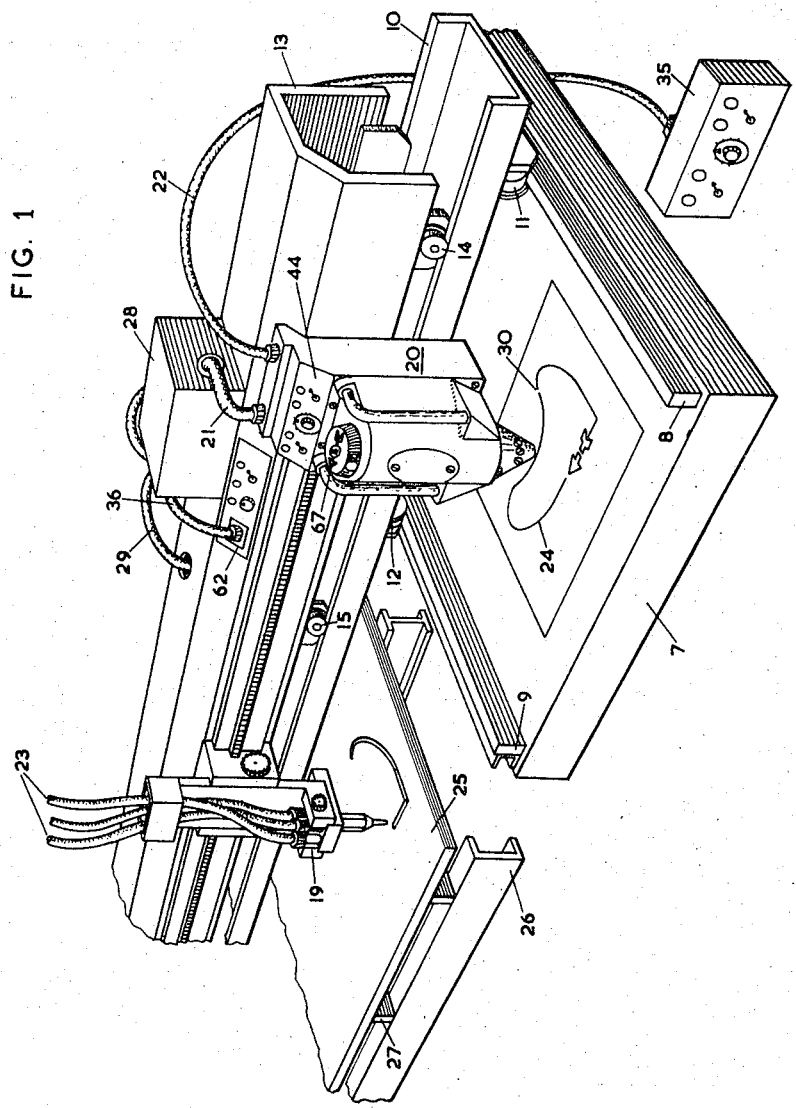

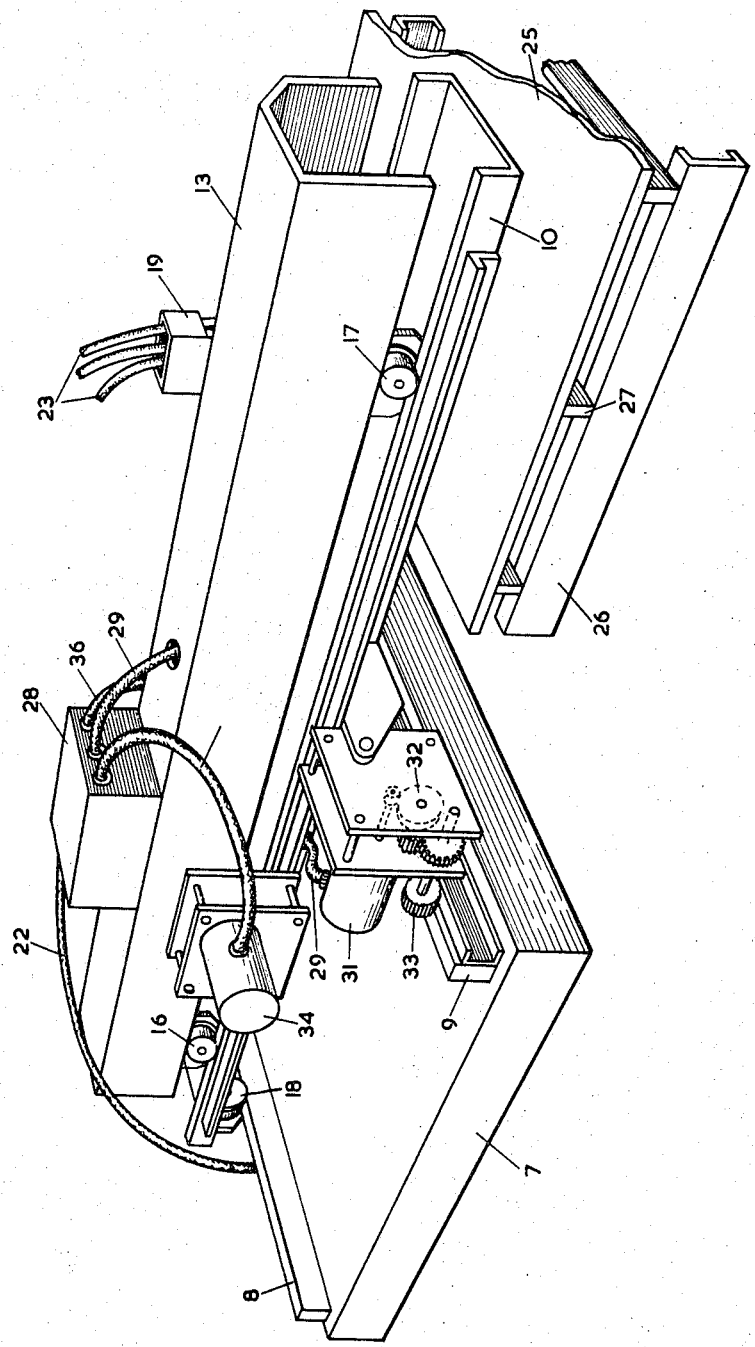

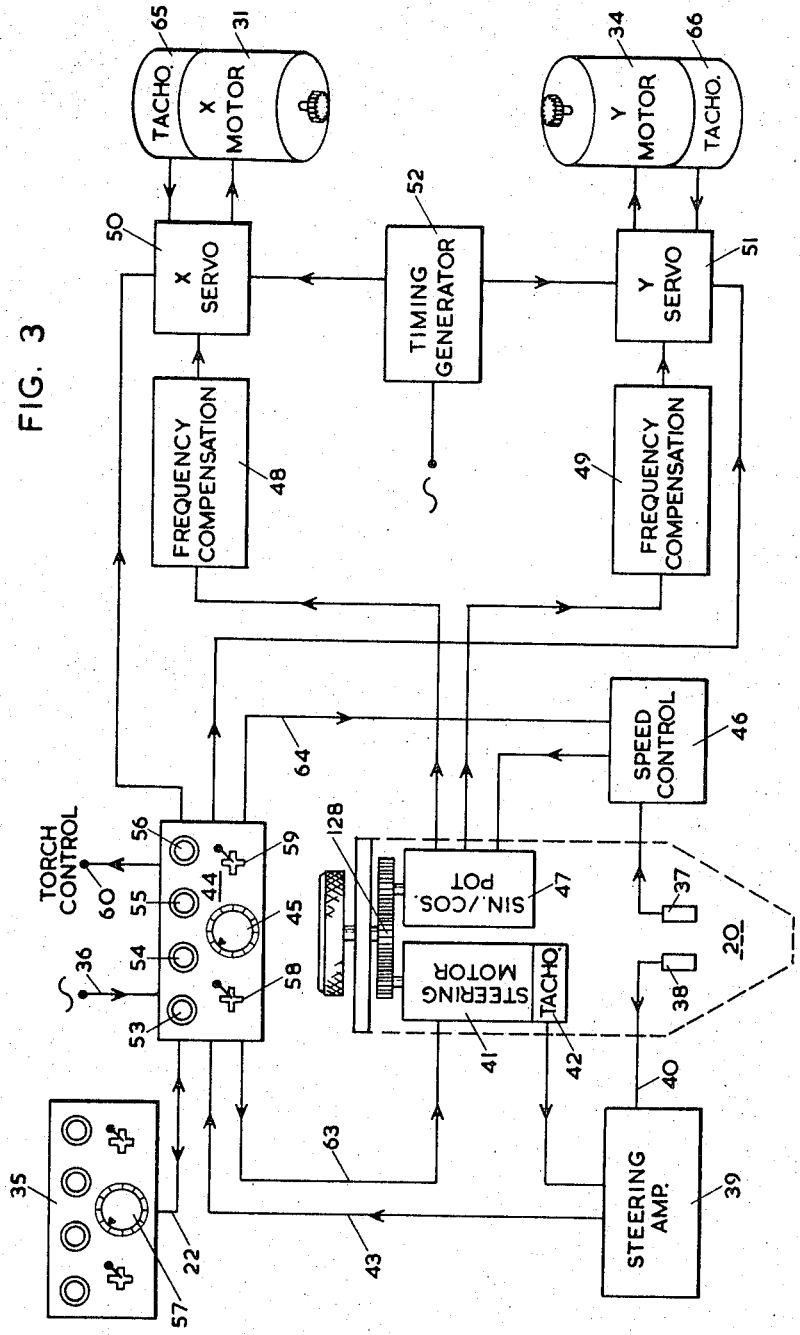

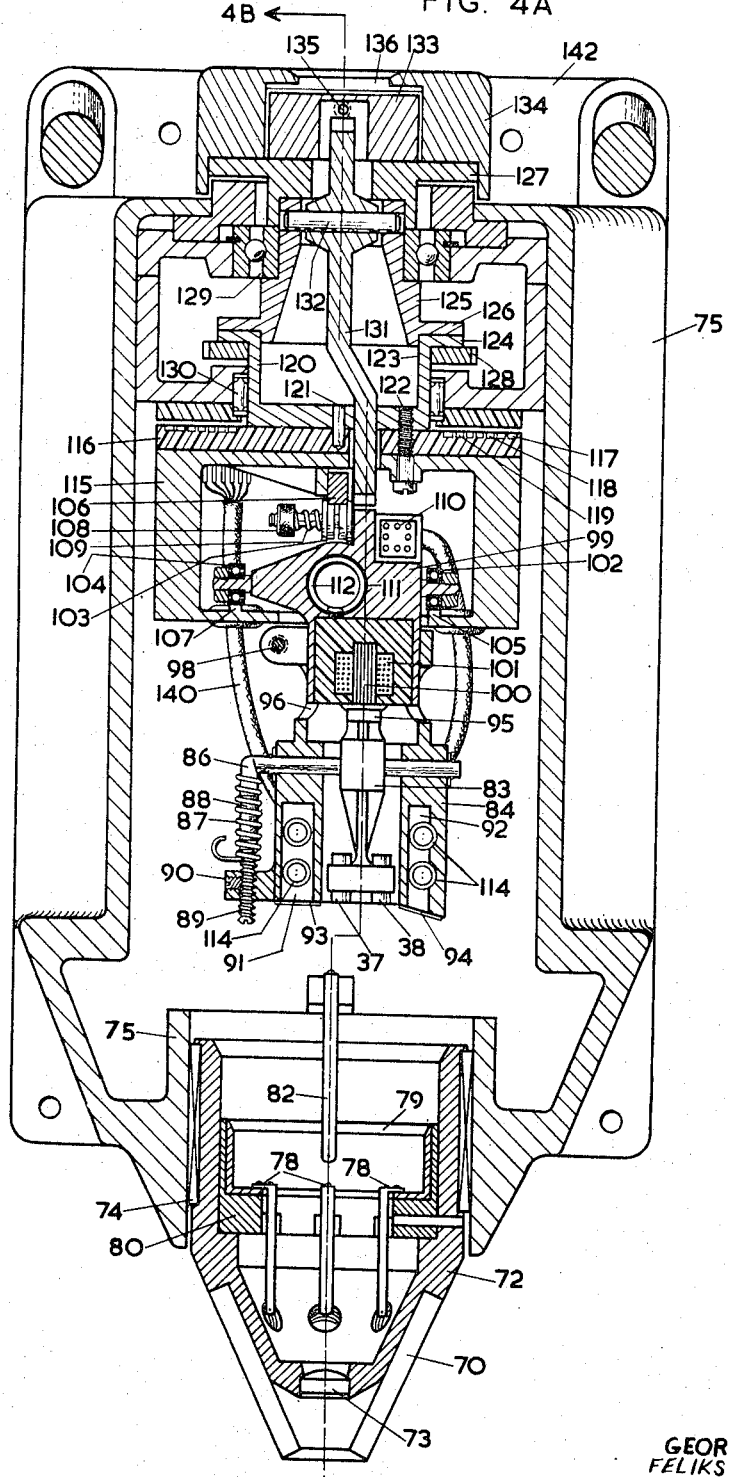

INVENTOR
GEORGE S. JEWELL
FELIKS KOOP
BY
ATTORNEY

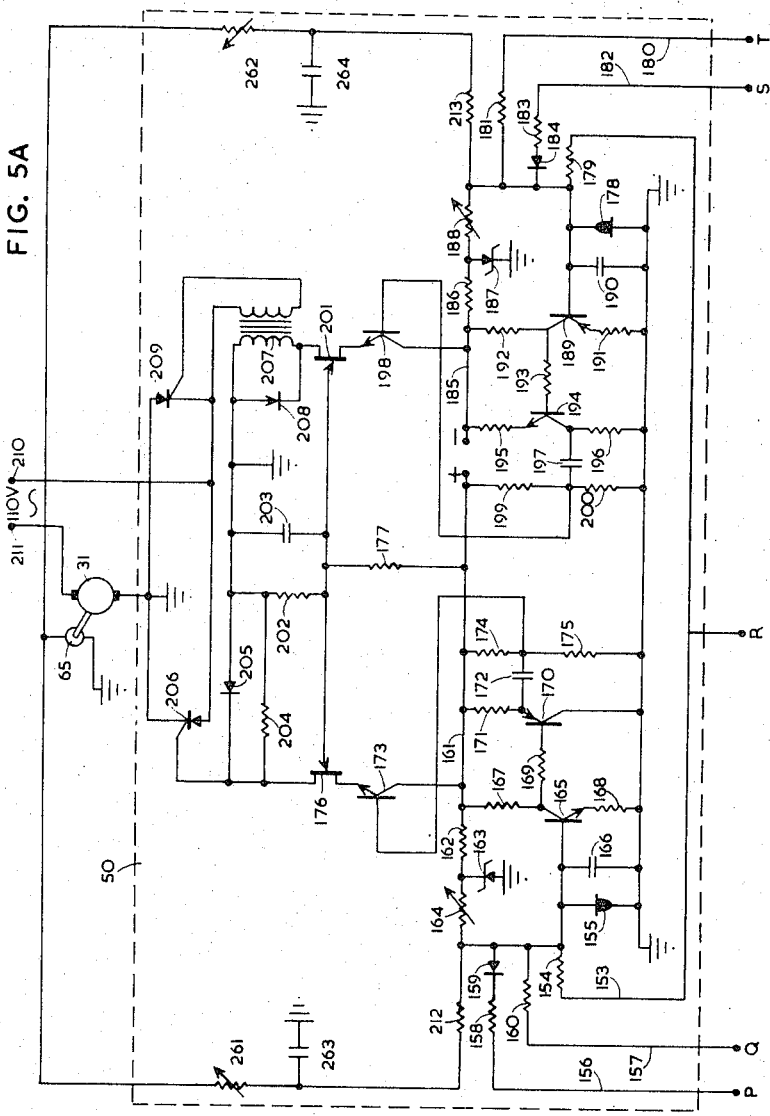

Jan. 30, 1968   G. S. JEWELL ET AL   3,366,857
CO-ORDINATE DRIVE LINE TRACER
Filed April 27, 1964   8 Sheets-Sheet 8

INVENTOR
GEORGE S. JEWELL
FELIKS KOOP

BY
Pennie, Edmonds, Morton, Taylor & Adams
ATTORNEY

United States Patent Office 3,366,857
Patented Jan. 30, 1968

3,366,857
CO-ORDINATE DRIVE LINE TRACER
George S. Jewell, Ancaster, Ontario, and Feliks Koop, Don Mills, Ontario, Canada, assignors to Canadian Westinghouse Company, Limited, Hamilton, Ontario, Canada, a company of Canada
Filed Apr. 27, 1964, Ser. No. 363,344
6 Claims. (Cl. 318—18)

ABSTRACT OF THE DISCLOSURE

In a high speed, co-ordinate drive, line tracer having a highly rigid transverse optical scanner, the co-ordinate drive motors are energized and controlled by pulse-duration modulated drive signals. In particular, the invention is directed to means for producing variable length pulses for energizing and controlling the co-ordinate drive motors. A tunnel diode is provided for combining the co-ordinate resolved velocity signal with a time ramp to produce an impulse which fires controlled rectifiers, in the motor supply line.

---

This invention relates to machine control devices and in particular to optical line tracing equipment.

In this specification it will be understood that the word "line" refers to a narrow elongated mark such as the mark made by a pencil or a pen. It does not refer to the separation between two contrasting surfaces such as an edge. These two words, that ist he word "line" and the word "edge" will be used to refer to two distinctly different geometric characteristics.

In machining material it is frequently desirable that a tool be caused to perform certain convolutions as indicated by a line drawing. Apparatus for causing a tool to follow such a line drawing has been known in the past. Apparatus has also been available in the past which would cause a tool to perform convolutions in accordance with the shape of the edge of a predetermined silhouette or pattern. All of these various methods are useful and have been used to control the motion of cutting tools particularly gas cutting torches. Those control systems which require silhouettes or specially prepared patterns obviously have certain disadvantages in particular every specific shape will require a specific pattern to be prepared for it. The preparation of a pattern may be almost as difficult as the actual cutting of the material. It is obviously desirable that the control be performed from the simplest prepared material.

There is, therefore, distinct advantage to apparatus which will follow a simple line drawing. In this case it is only necessary for the draftsman to prepare a suitable drawing of the part to be cut out. This drawing is then used to control the cutting tool. Obviously such a control can be performed manually by causing a pantographic operation with the operator moving one part of the pantograph over the line drawing while the other portion of the pantograph, bearing the cutting torch, cuts the desired shape from the material, which may for example be sheet steel. Automatic following of the line drawing has several advantages. First, it eliminates necessity of expensive hand labour. Second, it may ensure a constant cutting speed which is important in the case of gas cutting. Thirdly it may also speed up the operation and thus produce economies.

As the speed of cutting increases it becomes more and more difficult to automate the system. The tracing apparatus, for example, may tend to distort due to the centrifugal forces produced as the tracing apparatus goes around curves. Secondly, the size of the machine may be such that extremely high forces are produced due to inertia when the corners are negotiated at high speed. Large forces may also be required to operate tools particularly in the cases where the tool operated is a tool such as a milling cutter. These forces may affect parts of the machine other than the tracing apparatus.

When using optical line tracing, certain other problems may arise. For example, it may not be convenient to determine whether the optical system is properly focused on the line. It may also be necessary to produce sufficient, consistent, offset of the tool to allow for the width of cut. Finally in an optical line tracing system which uses a vibratory scanner for scanning the line, it may be convenient to operate the scanner at different frequencies depending upon the source of power supply. It will therefore, be desirable that the scanner be operable at these different frequencies.

A scanner which overcomes the foregoing difficulties and provides the facilities referred to is provided by producing a rigid transverse photo-scanning element whose natural frequency is adjustable and which is highly restrained in a transverse direction which includes suitable elements for viewing in advance of the point being traced. The photo scanning element is also arranged to permit offset correction and to indicate the condition of the optical apparatus by means of a light projected from the vicinity of the photo-scanning element.

The apparatus described further discloses a control system capable of supplying the forces required to control large high speed machine tools, which compensates for certain mechanical problems and operates in different modes under different conditions.

A clearer understanding of this invention may be had from the following description of one embodiment of a line tracer in accordance with this invention, including the drawings, in which:

FIGURE 1 is a perspective front view of a pantographic, automatic line tracing gas cutting machine utilizing the invention, FIGURE 2 is a perspective rear view of the same machine as shown in FIGURE 1, FIGURE 3 is a block diagram of the control system of the machine of FIGURE 1, FIGURE 4A is a sectional elevation of the scanning head of the machine shown in FIGURE 1.

FIGURES 5A, 5B, 6 and 7 are schematic diagrams of portions of the system shown as blocks in FIGURE 3.

Figure 4B:
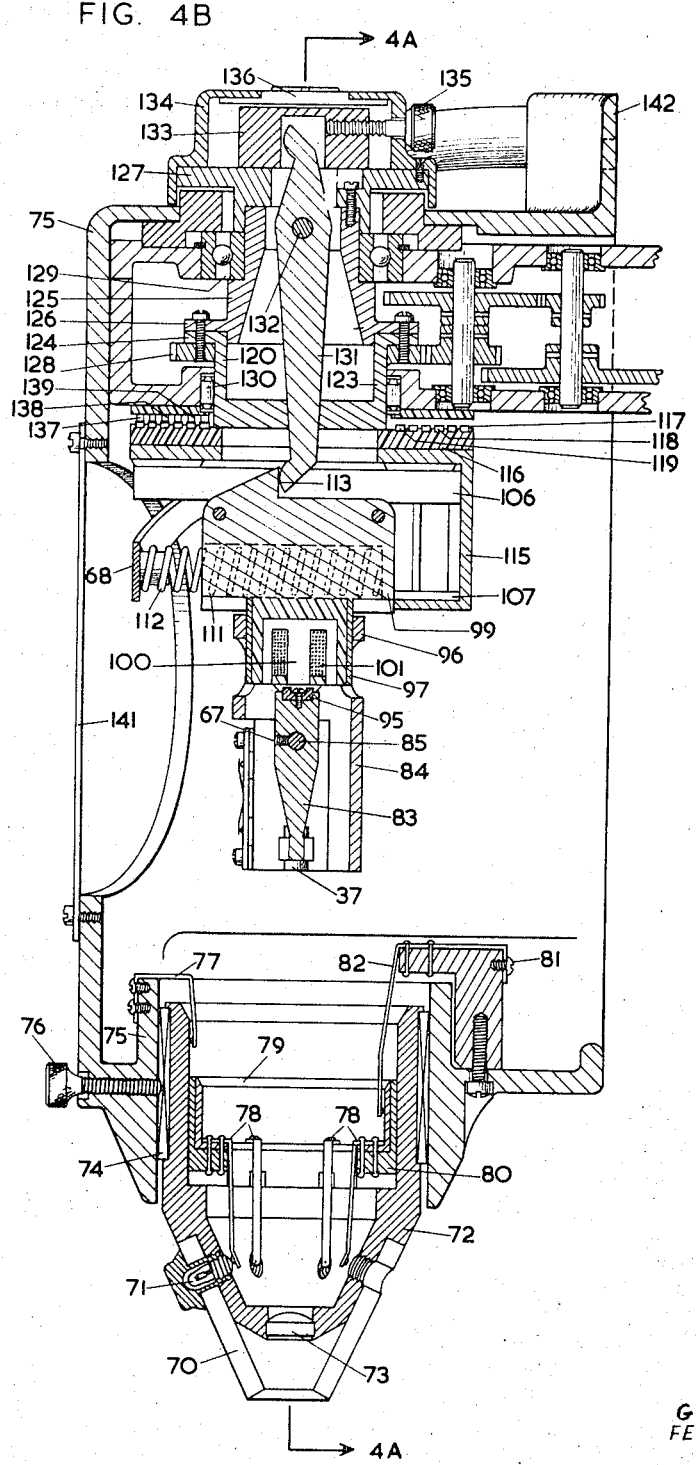
FIGURE 4B is a sectional elevation of the same scanning head as shown in FIGURE 4A at right angles to the section shown in FIGURE 4A.

Considering FIGURE 1 there is shown a pantographic gas cutting machine controlled by a photo-optical line tracer. The pantographic machine is shown somewhat schematically but includes a bedplate 7 and a pair of rails 8 and 9 mounted on the bedplate. A transverse beam 10 is mounted on rails 8 and 9 by means of rollers 11 and 12. Transverse beam 10, therefore, is permitted to move in a direction parallel to rails 8 and 9. Longitudinal beam 13 is mounted on transverse beam 10 by means of rollers 14 and 15. Longitudinal beam 13 may therefore move in a direction parallel to the transverse beam 10. Rollers 16 and 17 also supports longitudinal beam 13 and may be seen in FIGURE 2. Roller 18 which also supports transverse beam 10 may also be seen in FIGURE 2. A tracing head 20 is mounted on transverse beam 13. Suitable electrical connections are provided from the tracing head 20 through cable 21 to amplifier cabinet 28 and through cable 22 to remote control unit 35. The power supply for the control apparatus is derived from an outlet normally provided on the control panel 62 of the machine through a cable to amplifier cabinet 28. Near the other end of longitudinal beam 13 are mounted cutting torches, such as torch 19. These torches are normally provided with adjustments as illustrated, to permit changes in their location with respect to beam 13. Suitable gas supplies are provided to cutting torch 19 through tubes 23. A pattern in the form of a line 24 on a sheet of paper is placed on the bedplate 7. A steel plate 25 is supported in proper relationship to cutting head 19 on a supporting members including angle beams such as beam 26 and struts such as strut 27. Only a portion of the supporting member and the plate to be cut are shown. At point 30 on line 24 it will be noticed there is an interruption in the line and it is assumed that the operation has commenced from that point, as indicated by the cut already made in plate 25. Tracing head 20 is intended to control the machine in such a manner as to cause the tracing head to continue to travel around the line 24 until it returns to point 30. During the course of this action the burner 19 will follow a corresponding path thus cutting from plate 25 a piece of metal corresponding in shape to the line 24.

Further details of the general arrangement of the apparatus can be seen in FIGURE 2. The amplifier cabinet 28 which is coupled to tracing head 20 through cable 21 is also coupled to drive motors 31 and 34 through suitable cables. The cable to motor 34 is obvious but the cable to motor 31 is designated 29 and is looped in the interior of longitudinal beam 13 to produce a suitable flexible connection between the motor 31 and the amplifier cabinet. The transverse beam 10 is caused to move parallel to rails 8 and 9 by motor 31. The rotation of this motor causes a rotation of the gear train 32 which in turn drives the drive roller 33, which frictionally engages the flange of the channel beam adjacent rail 9 and drives the transverse beam back and forth along rails 8 and 9. In a similar manner motor 34 causes the longitudinal beam 13 to move back and forth relative to the transverse beam.

Considering FIGURE 3 there is shown a schematic diagram for the control system of the apparatus illustrated in FIGURES 1 and 2. Tracing head 20 includes a pair of photo-sensitive devices 37 and 38, which are caused to vibrate perpendicular to the direction of the line to be traced. A signal from the photo-sensitive device 38 is applied to steering amplifier 39 through conductor 40. This signal is amplified and applied through conductor 43 to control panel 44 and conductor 63 to energize steering motor 41, in the tracing head. For reasons to be explained a tachometer generator 42 is connected to the same shaft as steering motor 41 and the output from this tachometer generator is also applied to steering amplifier 39. The function of this portion of the apparatus is to cause the servo motor to rotate until such time as the photo-sensitive device 38 is vibrating in a direction transverse to the line being traced.

Control panel 44 mounted at the top of the tracing head 20 incorporates various controls to permit the operator to determine the mode of operation of the apparatus. This panel, and remote control unit 35, which is coupled to the panel through cable 22, have substantially equivalent control facilities except that in the remote control unit the speed setting control 45 is replaced with a remote steering control 57. The speed setting control in control panel 44 is coupled through conductor 64 to the speed control circuit 46. An output from the speed control circuit is applied to sine cosine potentiometer 47. The sine cosine potentiometer is mechanically coupled to the gear train in the tracing head 20. The gear ratio between the sine cosine potentiometer and the photocell carrier is one to one so that one rotation of the potentiometer is equivalent to one rotation of the photocell carrier. The operation of this potentiometer will be better appreciated from the subsequent explanation, however, as illustrated in this FIGURE 3 two outputs are derived from this potentiometer and applied through frequency compensation circuits 48 and 49 to X servo amplifier 50 and Y servo amplifier 51.

Certain waveforms required by the X and Y servo amplifiers are generated in timing generator 52. The output from servo amplifier 50 is applied to X servo motor 31 while the output from the Y servo amplifier 51 is applied to the Y servo motor 34. Tachometer generators 65 and 66 coupled to the shafts of the X and Y motors provide feedback to the X and Y servo amplifiers.

Also provided on the control panel 44 and the remote control unit 35 are a series of illuminated pushbuttons designated 53, 54, 55 and 56. Pushbutton 53 controls the application for supply power from conductor 36 to the remainder of the apparatus. Pushbutton 54 controls the energization of clutches between the X and Y motors and the machine when required. Pushbutton 55 controls the energization of lamps within the tracing head 20 and pushbutton 56 enables the signals from the sine cosine potentiometer to energize the X and Y servo amplifiers and permits the operator to conveniently locate the machine over the line. Corresponding functions are provided on the remote control unit except additionally the steering control 57 enables the operator to steer the head from a remote point.

Further controls 58 and 59 on the control panel 44 are switches capable of motion in either axis. Control 59 for example when pushed to the left will cause the head to move to the left at cutting speed as determined by control 45, and when moved to the right will cause motion in the reverse direction. Similarly when switch 59 is moved forward the head will move forward while when 59 is moved back the head will move back at cutting speed. Control 58 is identical in operation to control 59 except the speed of motion is always the same predetermined high speed unaffected by control 43 and may be used for rapid traverse of the machine. Again corresponding controls exist on the remote control unit.

Terminal 60 coupled to the control panel 44 provides a signal derived from steering amplifier 39 over conductor 43 which indicates whether the apparatus is moving under control. This signal may be provided to the machine control panel 62 and used to control the gas supplied to torch 19 so that the gas is cut off if the machine is not operating normally.

Conductor 63 also provides a reference signal to servo motor 41 from conductor 36 so that motor 41 rotates with a direction and speed related to the phase relationship between the signal from steering amplifier 39 and the reference signal.

A further signal indicative of the tracing condition is derived from photocell 37. This signal is applied to the speed control circuit 46.

FIGURE 3 should not be viewed as a wiring diagram of the system but only an illustration of the functional relationship of the various parts of the system. The single line conductors used should not be construed as single conductors but merely as indicative of functional relationships between the units joined thereby. A single line path may actually be indicative of several physical conductors.

Considering now FIGURES 4A and B, the photo-optical portion of the scanning head is illustrated in these figures in detail. As may be seen from these figures at the lower end of the photo-optical scanning head is transparent plastic cone 70. A plurality of lamps such as the lamp designated 71 protrude into the cone 70 and illuminate it so that light travels down the cone and is projected from its lower truncated end. The lamp holders serve to retain the cone 70 on the end of the lens tube 72. At the lower end of the lens tube is a lens 73. The upper end of the lens tube passes through a bushing 74 and is adjustably retained in the main body 75 by means of locking screw 76. Suitable electrical connections for the lamps are provided through sliding contacts produced by the brushes such as brush 77 which bears on the inner surface of the lens tube and thus provides a grounding contact for the shells of all the lamps. The end connections for the lamps are provided through spring contacts 78 which are connected to a sleeve 79 which is mounted within the lens tube 72 and insulated therefrom by a sleeve 80. Electrical contact to sleeve 79 is provided from terminal 81 through brush 82.

The photo-cells referred to in FIGURE 3 are shown above the lens tube and again designated 37 and 38. They are mounted in vibrator arm 83. The vibrator arm 83 is supported in vibrator assembly body 84 by means of shaft 85. One end of shaft 85 is turned down at right angles to produce an eccentric member 86 which projects into a resilient spring member 87. A rubber damping slug 88 fits snugly within the spring 87. An adjusting screw 89 threadably engages a bracket which projects from the body 84 and threadably engages the spring 87 to adjust the effective stiffness of the spring. A set screw 90 locks the screw 89 in position after adjustment as required to determine the natural frequency of the vibrating portion of the scanning device.

Cavities 91 and 92 within the body 84 have horizontal cross sections such as to represent the stem and head of an arrow with the head on the right hand side of FIGURE 4A and designated 92. At the lower end of these cavities are translucent plastic members 93 and 94 the upper surfaces being in the same optical plane as the face of photocells 37 and 38. At the upper end of arm 83 is a U shaped permanent magnet 95 which is retained thereon by means of a screw. The vibrator assembly is terminated by a split sleeve 96 which surrounds a cylindrical projection from the next portion and is retained thereon by means of tension bolt 98 which passes through a pair of tabs which project from the split sleeve.

The next portion which is the electro-magnet carrier body comprises a body 99. Projecting downward from this main portion is the cylindrical portion 97 which contains an electro-magnet designated 100. This electro-magnet consists of an E shaped core and a coil 101. The electro-magnet carrier is supported on ball bearings 102, 103 and 104 which function as rollers and ride on rails 105, 106 and 107 which are part of the slip ring carrier 115. The carrier is prevented from sliding sideways off the rails by virtue of the flanges on bearing 103 which engage the sides of rail 106 with a side force which is adjustable by means of a nut 108 and spring 109. It will be noted that rail 106 is adjustable in position to permit alignment and spacing of the rails to ensure the electromagnet carrier runs true without slack on the rails.

Also supported on the electromagnet carrier is a connector block 110 including the necessary conductors from electromagnet 100 and photocells 37 and 38.

Through the centre of the electromagnet carrier passes a tube 111 closed at one end and containing a spring 112. One end of the spring bears against the closed end of the tube and the other end projects from the tube and bears against bridge 68 which is removably fastened to the immediately succeeding portion of the scanning head thus causing the electromagnet carrier to be resiliently forced away from the bridge and towards the right of the assembly as illustrated in FIGURE 4B. A projection 113 projects upwards from the main portion of the carrier adjacent to rail 106.

At the top end of slip ring carrier 115 is mounted an insulating member 116. On the surface of this insulating member 116 are series of slip rings 117, 118, 119 etc. The slip ring carrier is located on the hollow shaft 120 by means of locating pin 121 and fastened thereon by means of bolts such as 122, which pass through the slip ring carrier 115 and into the hollow shaft 120.

The hollow shaft 120 comprises a lower portion 123 with a flange 124; an upper portion 125 having a flange 126 and a cap 127 which fits on to the upper portion of 125. A gear 128 is fastened to the flanges 124 and 126 by means of fastening bolts. The hollow shaft as a whole is mounted for rotation in the body 75 by means of bearing 129 which is retained on the upper part of the hollow shaft 125 by means of cap 127 and guide bearing 130 which engages the lower portion 123 of the hollow shaft.

A lever 131 is mounted for pivotal movement about a shaft 132 in the upper portion of the hollow shaft 125. The lower portion of this lever extends down into the slip ring carrier and engages the electro-magnet carrier at 113. The upper end of this lever 131 engages block 133. This block 133 is mounted within the knob 134, which in turn is mounted on the cap 127. The adjusting screw 135 passes through the knob 134 and engages the block 133. Rotation of the screw adjusts the position of the block and this in turn determines the position of the lever 131. A transparent window 136 closes the aperture at the top of the knob 134 and has engraved thereon a suitable cursor line which co-operates with a scale engraved on the surface of block 133 to indicate the position of the block relative to the knob. As may be seen from FIGURE 1 the cursor line on the window constitutes a portion of the arrow on knob 134. Adjustment of screw 135 produces an offset of the zero reference of the scale on the block and together with the cursor line indicates the degree of offset of the block 133 and hence the degree of offset of lever 131 and in turn the degree of offset of the electro-magnet carrier and its associated vibrator.

Suitable leaf type brushes engage the slip rings 117, 118, etc. as shown in FIGURE 4B and designated 137, 138, 139. Flexible connector 140 interconnects the slip rings 117, 118, 119, etc. and the connector 110 with a sufficient amount of slack to permit the electro-magnet carrier 99 to be completely withdrawn from within the body through the aperture shown on the left-hand side of FIGURE 4B after removal of bridge 68. As illustrated, a suitable cover 141 is provided to close off this aperture when the apparatus is in normal operation.

Mounting brackets are shown at 142 for mounting this sub assembly.

*Mechanical operation*

In operation, suitable electrical supplies are provided to the various portions of the system. Considering first the tracing head, a suitable potential is applied to terminal 81 and to the frame of the head to energize the lamps such as 71, causing light to be projected through the cone 70 and on to the paper or other substance on which the curve 24 has been drawn. This cone of light illuminates the line 24 and the image of the illuminated area is projected by means of lens 73 to a plane within the scanning head. The position of the lens cone is adjusted to bring the line to focus at the plane of the photocells 37, 38 as follows. The light from lamps 114 in the vibrator assembly impinges on the translucent members 93, 94 and is projected through lens 73 onto the paper. Since the translucent members 93 and 94 are in the same plane as the photo-cells 37, 38 then any line projected from the translucent surfaces 93, 94 will appear in focus on the same surface as the line 24 when the line 24 is in focus at the plane of the photo-cells. The lens cone 72 therefore is adjusted in the body after loosening set screw 76 until the arrow shaped pattern formed by cavities 91 and 92 and projected from the translucent surfaces 93, 94 appears in focus on the surface bearing the line to be traced. The set screw 76 is then tightened retaining the assembly in focus.

With the image of line 24 projected into the plane of photo-cells 37 and 38 and focused there, this image is scanned by the photo-cells as follows:

Suitable alternating current is supplied through brushes such as 137, 138 and slip rings 117, 118, etc. and conductor 140 and connector 110 to electro-magnet coil 101 causing the centre leg of the electro-magnet to be of one polarity and the outside legs of the opposite polarity, at any given time. The permanent magnet 95 attached to the upper end of the vibrator arm 83 is magnetized with one leg of one polarity and the other leg of the other polarity. Let use assume for the moment that the left leg of magnet 95 is a north pole and the right leg is a south pole, as shown in FIGURE 4B. Let use also suppose that the centre leg of the electro-magnet is north. In this case the outer legs will be south poles. Under these circumstances the right leg of the permanent magnet 95 will be attracted to the centre leg of the electro-magnet and the left leg of permanent magnet 95 will be attracted to an outer leg thus causing the vibrator arm 83 to rock, aligning the permanent magnet 95 essentially with the centre and left leg of the electro-magnet. By reversal of the current the centre leg of the electro-magnet will become a south pole and the outer legs north poles, thus repelling the permanent-magnet from its present position and causing it to move over to the other side with its left leg aligned with the centre leg of the electro-magnet and its right leg aligned with the right leg of the electro-magnet. Thus with each alternation of the alternating current supplied to the electro-magnet, the vibrator arm will swing from one side to the other.

The amplitude of vibration, of course, will depend upon the natural frequency of the vibrating assembly, which is determined by the polar moment of inertia of the vibrator arm, its axis 85 and the restoring force of spring 87. By proper design these parts may be selected as to provide the desired degree of oscillation with a minimum amount of energy provided by the electro-magnet 100.

The precise natural frequency of the assembly is arranged to be adjustable both for the sake of manufacturing convenience and also to permit operation of the apparatus with various supply frequencies. The adjustment is accomplished as follows. Member 68 is removed from the slip ring body permitting spring 112 to be withdrawn and the electromagnet carrier 99 rolled forward and out of the body of the tracing head. Set screw 90 is released and spring 87 is prevented from rotating, screw 89 is adjusted until the photocells 37 and 38 have a maximum oscillation in response to normal energization of the electromagnet 100. Screw 98 is now released and the spacing between magnet 95 and the electromagnet 100 is adjusted until the desired amplitude is obtained. The desired amplitude may be gauged by observing the photocells during oscillation. They will appear stationary at both ends of their maximum deviation. The amplitude is then adjusted until the two images just touch which means that the amplitude of oscillation is equal to twice the photocell diameter. With screw 98 still released the vibrator assembly may be rotated to properly align the photocells 37 and 38 with reference to the electromagnet carrier. Assuming the vibrator assembly is now operating in the proper manner, the photocell 37 swings back and forth in and out of the plane of the paper, as shown in FIGURE 4A and parallel to the plane of the paper as shown in FIGURE 4B. The electrical output from the photocells is connected through flexible connector 104 and slip rings 118, etc. and brushes such as brush 139 through conductor 40, as shown in FIGURE 3 to steering amplifier 39.

The specific arrangement of amplifier 39 will be later described but at present it will be assumed that the output from the photocell has an electrical characteristic indicative of the rotational position of the scanning device with reference to the line being traced. This electrical output is amplified in the amplifier 39 and applied through control panel 44 to the servo motor 41. Servo motor 41 drives a gear train which in turn engages gear 128 thus turning the whole mechanism including the hollow shaft 120, the slip ring carrier 115, the electromagnet carrier 97 and the vibrator assembly 84, until the direction of vibration of the photocell 38 is exactly at right angles to the line 24.

The tachometer 42 feeds back to the steering amplifier a signal representative of speed of rotation of the servo motor 41. This signal is in opposition to the signal provided to the steering amplifier on conductor 40. In a well known manner this permits the amplification of the steering amplifier 39 to be high and still not cause overshoot. In general therefore it will be understood that the operation of this portion of the system ensures that the vibrator assembly will vibrate transverse to the line.

Also driven by gear 128 is a similar gear coupled to the shaft of the sine cosine potentiometer 47. The ratio between gear 128 and the gear of the shaft of the sine cosine potentiometer is 1 to 1 so that rotation of the optical assembly corresponds to one rotation of the sine cosine potentiometer. A suitable signal indicative of the desired tangential speed of tracing is applied to the sine cosine potentiometer from speed circuit 46. The sine cosine potentiometer, by virtue of its construction, resolves this speed input into two signals representative of co-ordinate velocities required to produce this particular tangential velocity. These two co-ordinate velocities are in the X and Y directions and indicate the required X and Y velocities required to cause a point to move tangential to the line at the indicated velocity. These two co-ordinate velocity signals are applied through frequency compensation 48 to servo amplifier 50 and through frequency compensation 49 to Y servo amplifier 51 and from thence to the driving motors 31 and 34 respectively. As a result, therefore, the speed of rotation of motor 31 is proportional to the desired X co-ordinate velocity and the speed of motor 34 is proportional to the desired Y co-ordinate velocity. These motors 31 and 34 are coupled by means of gear trains, as illustrated in FIGURE 2, to the frame of the machine in such a manner as to cause a transverse beam 10 to move along rails 8 and 9 that is in the X direction in accordance with the speed of motor 31 to cause the beam 13 to move and to cause the longitudinal beam 13 to move parallel to the axis of the transverse beam 10 with a velocity determined by the Y co-ordinate signal from the sine cosine potentiometer.

It will be appreciated, therefore, that the tracing head moves along the line with a velocity determined by the speed signal applied to the sine cosine potentiometer by virtue of the rotation of motors 31 and 34. Since cutting torch 19 is mounted on longitudinal beam 13 it also executes the same convolutions as the tracing head and cuts from the sheet 25 a track corresponding to the line 24.

To start up the machine, the operator actuates a pushbutton 53 on the control panel 44 energizing various portions of the system and also illuminating an indicator associated with the pushbutton 53 to show that the apparatus is now functioning. The spot lights 114 may be energized by pressing pushbutton 55 which causes an illuminated arrow to be projected on the paper. A signal is applied to the sine cosine potentiometer from the speed control 45 and the head may be steered by turning knob 134. In this manner, with pushbutton 56 depressed, the tracing head may be moved until the projected arrow falls on the line to be traced. When the line is properly intersected and the apparatus is in position to properly trace the line the lamp associated with pushbutton 56 will illuminate which indicates that the button 56 may be released and the apparatus will continue to trace the line properly.

It will be appreciated that if the torch exactly follows the motion of the tracing head then the centre line of the cut of the torch will correspond to the line 24. If, however, line 24 is supposed to represent the external dimension of the piece to be cut, it will be evident that the piece cut from sheet 25 will not correspond but will be less than the desired size by an amount equal to one-half the width of the torch cut. The width of cut is generally referred to as kerf. It is desirable, therefore, that adjustment may be made to allow for the width of kerf. To this end the whole scanner assembly may be adjusted transversely to the line. This is done by moving the electromagnet carrier on its rollers on rails 105, 106 and 107. As will be seen in FIGURE 4B, this carrier is urged in a direction left to right, as illustrated, by spring 112. It is however inhibited from moving in this direction by the reaction of projection 113 against the end of lever 131. Lever 131, of course, is free to rotate about its pivot 132 but is restrained from rotation by block 133. Block 133 is, in turn, adjusted in its position by means of adjusting screw 135. Spring 112, therefore, in effect puts screw 135 in tension and by adjusting the rotational position of screw 135, it is possible to adjust the transverse position of block 133 and in turn the transverse position of the electro-magnet carrier 99.

It will also be appreciated that the effect of the lever is to reverse the direction of motion of the electro-magnet carrier with reference to the direction of motion of the block. As will be evident from FIGURES 4A and 4B the optical system between the line and the photocells is such that a given transverse motion of the photocells is equivalent to a lesser transverse motion at the surface of the pattern. In a manner similar, a given transverse motion of block 133 is equivalent to a greater transverse motion of the electro-magnet carrier 99. The proportions of lever 131 are so chosen that a given adjustment of block 133 is equivalent to the same transverse motion of the line with respect to the photocells. The reversal of motion caused by the mechanical lever is again produced by the optical lever and the motion of the electro-magnet carrier is equivalent to a reverse motion of the line on the surface of the paper. In other words, a given transverse motion of block 133 is equivalent to displacing the line being traced by the same amount. The scale inscribed on block 133 therefore represents by its displacement the effective degree of displacement from the line to be traced. By reading on the scale, through window 136, the displacement of the zero line on block 133, one can ascertain the degree of offset of the scanning head with reference to the line, or the degree of kerf correction and the direction of kerf correction. When the kerf cut by the gas cutting torch is known, it is therefore possible to adjust screw 135 until the degree of kerf correction required is applied and the piece cut from plate 25 is essentially the same in its external dimensions as is the line 24.

As will be seen this indicator has the peculiar advantage of presenting to the operator a pictographic representation of the situation. He can quickly observe the relationship between the line to be followed and the cutting torch and readily appreciate the degree of kerf correction.

*Electrical system*

Figure 5B:
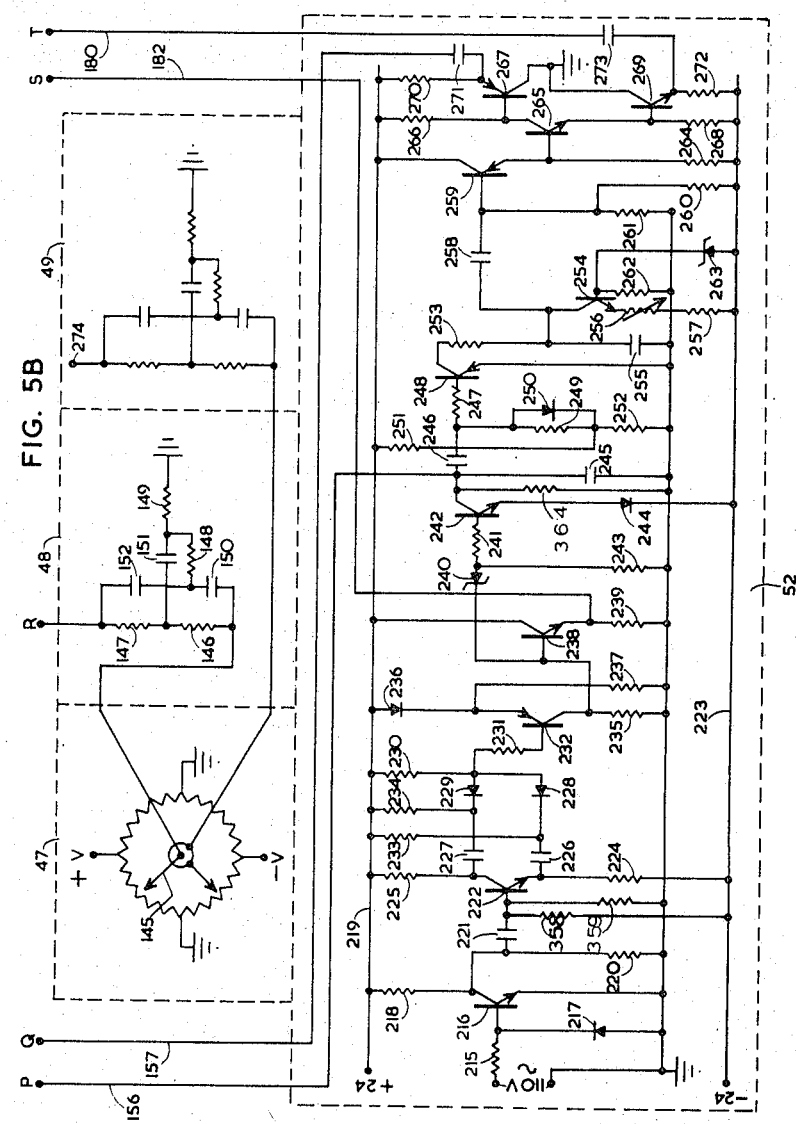

Considering first in the electrical system the circuits illustrated in FIGURES 5A and 5B assuming 5A and 5B to be arranged adjacent to each other with points P, Q, R, S and T interconnected, there is shown in these figures the elements illustrated in the block diagram of FIGURE 3 as the sine cosine potentiometer 47, the frequency compensation devices 48 and 49, the X servo amplifier 50 and the timing generator 52. Various units so designated are separated from each other by dotted lines in this schematic diagram and bear the same designations as in FIGURE 3. The sine cosine potentiometer consists of a circular resistance having four taps at right angles to each other, the upper and lower taps being provided with voltage and the co-ordinate taps being grounded. Two sliding contacts at right angles to each other derive voltages with reference to ground from this potentiometer, one voltage being the X co-ordinate voltage and the other being the Y co-ordinate voltage. The characteristic of the circular resistance is such that $$V \sin \phi + V \cos \phi = V$$

Where $V \sin \phi$ is the Y co-ordinate signal and $V \cos \phi$ is the X co-ordinate signal and $\phi$ is the angle of the pick-up arms relative to the stationary portion of the potentiometer.

Considering the circuit utilizing the voltage from slider 145, it will be seen that voltage is applied to frequency compensation 48. The frequency compensation consists of a twin T filter comprising resistors 146, 147, 148, 149 and capacitors 150, 151 and 152. This frequency compensation device is designed to reject signals having the same frequency as the natural mechanical frequency of the machine tool which would otherwise cause problems in the servo loop. This natural frequency will be of the order of a few cycles per second and should not be confused with the supply frequency. The output from this filter is applied to conductor 153 in the X servo amplifier 50. It will be noted that the X servo amplifier is a dual circuit for providing both positive and negative rotational signals to the X servo motor.

Considering first the left hand section which we will refer to as the positive section, it will be seen that the tunnel diode 155 on this side, is provided with a plurality of signals from various sources. The first signal is supplied from conductor 153 through resistor 154 to the diode. A second signal is provided from conductor 156 and applied through resistor 158 and diode 159 to diode 155. A third signal on conductor 157 is applied through resistor 160 to diode 155. A fourth signal is provided from the tachometer generator 63 through resistor 212 and variably resistor 261. Lastly, a bias signal is derived from the positive supply line 161 through resistor 162 and is stabilized by zener diode 163 and adjusted by adjustable resistor 164 to provide a fixed operating current for the tunnel diode 155. The output from tunnel diode 155 is applied to the base of transistor 165. The base of this transistor is coupled to ground through capacitor 166. The collector of transistor 165 is connected to the positive supply on conductor 161 through resistor 167 and the emitter is connected to ground through resistor 168. The output from transistor 165 is applied through resistor 169 to the base of transistor 170. The collector of transistor 170 is grounded and the emitter is connected to the positive supply through resistor 171. The output from transistor 170 is applied through capacitor 172 to the base of transistor 173. The base of transistor 173 is maintained at a positive potential by means of potentiometer consisting of resistors 174 and 175 in series between conductor 161 and ground. The output from the emitter of transistor 173 is applied to unijunction transistor 176. The collector of unijunction 176 is connected to a positive supply provided by potentiometer consisting of resistors 177 and 202 between the positive supply line and ground.

In a similar manner it will be noted that a circuit exists for providing control of negative rotation which circuit consists of the portion on the right hand side of the diagram including inputs to the tunnel diode 178. These inputs are applied from conductor 153 to resistor 179 to the diode and from timing generator 52 through conductor 180 and resistor 181, to the diode 178 and also from the timing generator over conductor 182, resistor 183 and diode 184 to the tunnel diode 178. The bias is provided from the negative supply on conductor 185 through resistor 186 and is stabilized by zener diode 187 and controlled by a variable resistor 188. A signal from the tachometer generator 65 is applied through resistors 262 and 213 to the tunnel diode 178. The output from tunnel diode 178 is applied to the base of transistor 189. The base of transistor 189 is bypassed to ground through capacitor 190. The emitter of transistor 189 is connected to ground through resistor 191. The collector of transistor 189 is connected to a negative potential on conductor 185 through resistor 192 and through resistor 193 to the base of transistor 194. The emitter of transistor 194 is connected to a negative supply through resistor 195. The collector of transistor 194 is connected to ground through resistor 196 and through capacitor 197 to the base of transistor 198. The base of transistor 198 is connected to the junction point between resistors 199 and 200 which extend between the positive supply on conductor 161 to ground. The collector of transistor 198 is connected to the negative supply on conductor 185 and the emitter is connected to the unijunction 201. The collector of the unijunction 201 is connected to the collector of unijunction 176 and thus is provided with a positive supply from the same potentiometer as referred to previously. These collectors are also by-passed to ground through capacitor 203.

The remaining electrode of unijunction 176 is connected to ground through resistor 204 and diode 205 and directly to the gate electrode of the controlled silicon rectifier 206. In a similar manner the remaining electrode of unijunction 201 is connected to ground through the primary of transformer 207 which is by-passed by diode 208 to ground. The secondary of transformer 207 is connected between the base electrode and gate electrode of controlled silicon rectifier 209. The cathode of controlled silicon rectifier 206 and the anode of controlled silicon rectifier 209 are connected together and to terminal 210 which is one side of 110 volt alternating current supply. The anode of controlled silicon rectifier 206 and the cathode of controlled silicon rectifier 209 are connected together to ground and to one terminal on motor 31. The remaining terminal of motor 31 is connected to the terminal 211 which is the opposite terminal of the 110 volt AC supply. One terminal of tachometer 65 is also connected to ground and its remaining terminal is connected to resistors 261 and 262 as previously recited.

Considering now block 52, this is a timing generator which is provided with a reference alternating voltage from the power source which is applied to its input terminals and clipped by diode 217 and applied through resistor 215 to the base of transistor 216. The collector of transistor 216 is provided with a positive potential from the potentiometer consisting of resistors 218 and 220 between positive supply line 219 and ground. The emitter of this transistor is directly connected to ground and an output is obtained from the collector of this transistor and applied through capacitor 221 to the base of transistor 222. The base of transistor 222 is maintained at a negative potential derived from potentiometer consisting of resistors 358 and 359 connected between the negative supply line 223 and ground. The collector of this transistor is connected to the positive supply line through resistor 225 and the emitter of this transistor is connected to the negative supply through resistor 224. The output is obtained from the collector of this transistor through capacitor 227 and applied to diode 229. The anode of this diode is connected through resistor 234 to a positive potential. Similarly an output is obtained from the emitter of transistor 222 and applied through capacitor 226 to diode 228. The anode of this diode is connected to the positive supply line through resistor 233. The cathodes of both the diodes are connected together and supplied with a positive potential through resistor 230 which is connected to the positive supply line. Their cathodes are also connected through resistor 231 to the base of transistor 232. The emitter of transistor 232 is connected to a source of positive supply through diode 236 and also to ground through resistor 237. The collector of this transistor is connected to ground through resistor 235 and directly to the base of transistor 238.

The collector of transistor 238 is connected to positive supply line 219 and the emitter is connected to ground through resistor 239. An output is obtained from the emitter of transistor 238 and applied to conductor 182. The base of transistor 238 is also connected through zener diode 240 and resistor 241 to the base of transistor 242. The junction of zener diode 240 is connected to ground through resistor 243.

The collector of transistor 242 is connected to the ground through resistor 364 and capacitor 245. The emitter of this transistor is connected to the negative supply line through diode 244. The output is derived from the collector and applied to conductor 156.

A further output from transistor 242 is applied through capacitor 246 and resistor 247 to the base of transistor 248. The junction of capacitor 246 and resistor 247 is connected to a positive potential established by the potentiometer consisting of resistor 251 and resistor 252 between the positive supply line and ground through the parallel arrangement of resistor 249 and diode 250. The emitter of transistor 248 is connected to ground and the collector of this transistor is connected through resistor 253 to the collector of transistor 254, and through capacitor 255 to ground. The collector of transistor 254 is also connected through capacitor 258 to the base of transistor 259. The base of transistor 254 is connected to ground through resistor 262 and to the negative supply through zener diode 263. The emitter of transistor 254 is connected through resistor 257 and variable resistor 256 to the negative supply line 223. The base of transistor 259 is connected to ground through resistor 261 and to the negative supply through resistor 260 thus being provided with a negative potential. The emitter of transistor 259 is connected to the negative supply line through resistor 264 and the collector is connected directly to positive supply line 219. The emitter of this transistor is also connected to the base of transistor 265. The collector of transistor 265 is connected to the positive supply line through resistor 266 and the emitter is connected to the negative supply line through resistor 268. The collector of transistor 265 is directly connected to the base of transistor 267 and the emitter of transistor 265 is directly connected to the base of transistor 269. The collectors of both transistors 267 and 269 are connected together and connected to ground. The emitter of transistor 267 is connected to positive supply line through resistor 270 while the emitter of transistor 269 is connected to the negative supply line through resistor 272. Outputs are obtained from both these emitters through capacitors 271 and 273 respectively, and applied to conductors 157 and 180 respectively.

The operation of this portion of the circuit may now be explained. Considering first the lower portion within block 52 this is the timing generator, the alternating current applied to the input terminals is clipped by diode 217 and the voltage appearing at the base of transistor 216 is a series of positive pulses. Transistor 216 is operating well in saturation and the output therefore is a clipped sinewave which is essentially a square wave. The output from this transistor is applied through capacitor 221 and resistor 359 which form a differentiating circuit. Their time constant is so small that condenser 221 discharges through the resistor after each rectangular wavefront with a result that the input to the base of transistor 222 is a series of positive and negative impulses. Transistor 222 acts as a phase splitter providing a series of pulses in one phase to diode 229 and a series of pulses in the reverse phase to diode 228. Since these diodes are poled in the same direction only pulses of the same polarity appear on their cathodes and the two series of opposite phase impulses are converted to a single series of negative impulses which are then applied to the base of transistor 232. This transistor is normally cut off by virtue of the positive voltage applied to its base through resistors 230 and 231 and the diode 236 in its emitter circuit. The negative impulses on its base cause it to conduct a series of positive impulses on its collector. Since the collector is connected to the base of transistor 238 which is an emitter follower, a series of positive pulses appear on the emitter of this transistor and are applied from thence to conductor 182 and used to supply the tunnel diode 178. The pulses on the base of transistor 238 are also applied to zener diode 240 and resistor 241 to the base of transistor 242. This transistor is normally cut off by the ground potential applied to the base through resistor 243 and the negative potential applied to the emitter by diode 244. The positive impulse cause it to conduct producing negative impulses on its collector which are applied to conductor 156. These impulses are also applied to capacitor 246 and differentiated by this capacitor and resistors 249 and 252 to the ground. The potentiometer consisting of resistors 251 and 252 provides a positive potential to the base of transistor 248 which would cause it normally to be cut off. The diode 250 and resistor 249 operate as a DC restorer causing the impulses which are transmitted through capacitor 246 to be super-imposed as negative impulses on the bias derived from the potentiometer. These negative impulses cause the transistor to conduct for a very short duration every one-half cycle of the supply.

The following portion of the circuit is intended to create a ramp function by the controlled charging of capacitor 255. This capacitor charges at a constant current through resistors 256 and 257 and the emitter of transistor 254 to the collector. This is a constant current source by virtue of the constant potential applied to the base of transistor 254 from the zener 263.

This charging would continue until the capacitor potential approached 24 volts if it were not for the operation of the transistor 248, which when the pulse is applied to its base suddenly becomes conductive and discharges capacitor 255. C and R are so chosen that the potential of C is approximately minus 10 volts when it is suddenly discharged by conduction of transistor 248. The ramp function so generated is applied through capacitor 258 to the base of the emitter follower 259 and the output derived from the emitter is applied to the base of the phase splitter 265. The potential of the base of this transistor is established by a resistor 264. The ramp function which is applied to this base from the emitter follower causes signals of opposite phase to appear on the collector and emitter of the transistor which are provided with positive and negative potential from the respective supply lines through resistors 266 and 268. The output from the collector is applied to the base of transistor 267 amplified and applied through capacitor 271 to conductor 157 while the output on the emitter is applied to the base of transistor 269 amplified and applied through the capacitor 273 to conductor 180.

The outputs which therefore are produced by the timing generator are a pair of opposite phase pulses which appear on conductors 156 and 182 and a pair of opposite phased ramp functions which appear on conductors 180 and 157.

Let us now consider the operation of the left hand portion of the upper circuit. Assuming the ramp function on conductor 157 to occur repetitively, commencing each time at a time referred to as zero time and the reset pulse to be appearing on conductor 156 with a signal applied from the sine cosine potentiometer via resistor 154 to diode 155 and the point of operation of the diode determined by the bias circuit including variable resistor 164 it is obvious that at some time determined by the slope and amplitude of the ramp function on conductor 157, the diode will become conductive. We may at this point neglect the tachometer signal appearing through resistor 212. Since the signal from the sine cosine potentiometer is a fixed voltage until such time as the sine cosine potentiometer rotates and since the bias is a fixed voltage and assuming there is no reset impulse being applied on conductor 156 and since we are disregarding the signal from resistor 212 it will be obvious that the only variable is the ramp function of conductor 157. This ramp function is however repetitive and will cause the diode to become conductive at the same time with reference to zero time on every ramp cycle as long as the voltage from the sine cosine potentiometer is a constant. The various signals are so arranged that the greater the signal from the sine cosine potentiometer the sooner the diode 155 becomes conductive. In other words the signal from the sine cosine potentiometer and the ramp function are of the same effective polarity and add to each other to cause the diode to become conductive. The time of conduction of the diode is therefore a measure of the amplitude of the signal from the sine cosine potentiometer.

The characteristic of the tunnel diode is such that after having become conductive it will remain in that condition until reset. It is for this reason that an impulse is applied through conductor 156 to the tunnel diode. This impulse causes the diode to be returned to its original condition by applying an impulse of polarity reverse to that supplied from the sine cosine potentiometer and of such amplitude as to cause the diode to resume its original state. It remains in this state until once again the result of the various voltages including the ramp function and the signal from the sine cosine potentiometer is such as to cause the diode to become conductive. The result is therefore a series of impulses caused by conduction of the tunnel diode whose time with reference ot zero time is dependent upon the amplitude of the signal from the sine cosine potentiometer.

These impulses are amplified and utilized to control the unijunctions 176 and 201. These unijunctions in turn control the controlled silicon rectifiers causing the supply path from motor 31 to become conductive for a period of time dependent upon a signal applied from the sine cosine potentiometer.

If the signal from the sine cosine potentiometer is of the opposite polarity this will cause the other tunnel diode to become conductive at a given time thus the other path will become effective and the path for motor 31 will become conductive in the reverse direction thus causing motor 31 to rotate in the reverse direction. It will be appreciated therefore that the speed of rotation and direction of rotation of motor 31 is dependent upon the signal appearing on slider 145 of the sine cosine potentiometer.

In a similar manner the signal appearing at terminal 274 derived from the other slider of the sine cosine potentiometer is applied to its corresponding Y servo control and causes the Y motor to rotate with a speed and direction dependent upon the signal appearing on the other slider of sine cosine potentiometer.

The signal produced by the tachometer is proportional to the speed of rotation of motor 31. Therefore if motor 31 is stationary and the signal from the sine cosine potentiometer indicates that motor 31 should be rotating rapidly, a large current will be produced since diode 155 will conduct early in the cycle and its controlled rectifier will conduct early in the cycle thus causing substantial current to flow through motor 31. However, once motor 31 is rotating rapidly a signal of the same amplitude from sine cosine potentiometer will not cause such an effect upon the tunnel diode 155 because it is opposed by the voltage now being generated by the tachometer generator 65. This enables a high gain circuit to be used so that rapid acceleration of motor 31 is possible but the chance of overshoot is reduced because once motor 31 is rotating rapidly, the tachometer signal negates a portion of the signal from the sine cosine potentiometer. The addition of variable resistors 261 and 262 permits adjustment in the effect of the tachometer signal while capacitors 263 and 264 eliminate transients to prevent too rapid changes in tachometer signals.

Figure 6:
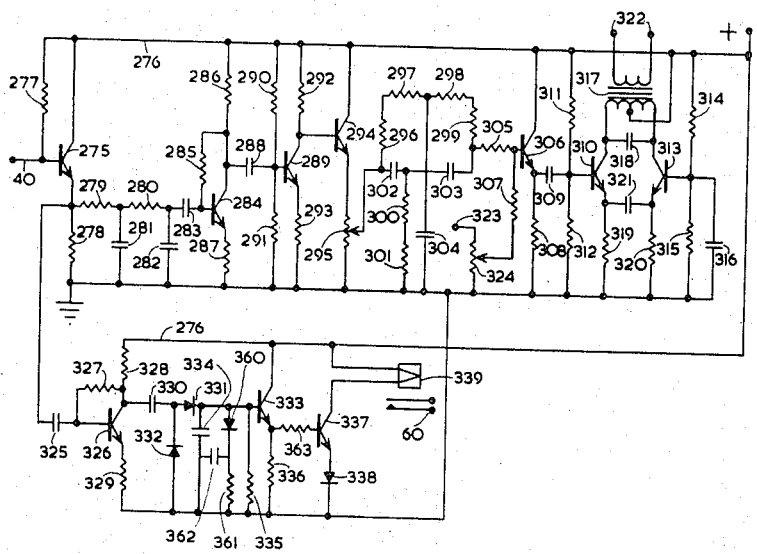

Considering now FIGURE 6 there is shown a circuit diagram for the steering amplifier 39 and certain other apparatus included within the control panel 44. The output from the photocell 38 is applied over conductor 40 to the base of transistor 275. The base of this transistor is also connected to a positive supply line through resistor 277. The collector of the transistor 275 is directly connected to the positive supply line and the emitter is connected to ground through resistor 278. A portion of the output from the emitter is applied through capacitor 325 to another portion of the circuit but primarily it is applied through the network comprising resistor 279, capacitor 281, resistor 280 and capacitor 282 through capacitor 283 to the base of transistor 284. The base of transistor 284 is connected to the positive supply line through resistors 285 and 286 and the collector is directly connected to the positive supply line 276 through resistor 285. The emitter is connected to ground through resistor 287. The output from the collector is connected through capacitor 288 to the base of transistor 289. The potential of the base of transistor 289 is established by a potentiometer consisting of resistors 290 and 291 from the positive supply line to ground. The emitter of transistor 289 is connected to ground through resistor 293 and the collector of transistor 289 is connected to a positive potential through resistor 292. An output from the collectors is applied directly to the base of emitter follower 294, the collector of this transistor is connected to the positive supply and the emitter is connected through potentiometer 295 to ground. The slider of potentiometer 295 is connected through a filter network comprising resistors 296, 297, 298 and 299 and capacitors 302, 303 and 304 and resistors 300 and 301 through resistor 305 to the base of transistor 306. An output signal from tacho generator 42 is applied to the base of transistor 306 from terminal 323 through potentiometer 324, from the slider of this potentiometer through resistor 307. The collector of transistor 306 is directly connected to the supply line 276 and the emitter is connected through resistor 308 to ground. The output from this emitter follower is applied through capacitor 309 to the base of transistor 310. The potential of the base of transistor 310 is established by potentiometer consisting of resistor 311 and 312. Corresponding transistor 313 has a base potential established by the potentiometer 314 and 315 from the positive supply line 276 to ground, and is by-passed to ground through capacitor 316. The emitter of transistor 310 is connected to ground through resistor 319 and to the emitter of transistor 313 through capacitor 321. The emitter of transistor 313 is connected to ground through resistor 320. The collectors of these two transistors are connected to opposite ends of the primary of transformer 317 and supplied with a positive potential from the positive supply line through the centre tap of this primary. The primary is also by-passed by capacitor 318. The output from transformer 317 appears across terminal 322 and is applied to motor 41.

A further output from the emitter of transistor 275 is applied through capacitor 325 to the base of transistor 326. The base of this transistor is connected to the positive supply through resistors 327 and 328 to the positive supply line 276. The collector of transistor 326 is connected to the positive supply line through resistor 328. The emitter of transistor 326 is connected to ground through resistor 329. The output from the collector of transistor 326 is applied through capacitor 330 to the cathode of diode 331 and the anode of diode 332. The cathode of diode 332 is connected to ground and the anode of diode 331 is connected to the base of transistor 333 and to ground through capacitor 334.

The base of transistor 333 is also connected to ground through diode 360 and resistor 361 the latter being by-passed to ground through capacitor 362. A further resistor 335 also connects to the base of transistor 333 to ground. The collector of transistor 333 is connected to positive supply line 276 and the emitter is connected through resistor 336 to the ground. The output from the emitter is connected through resistor 363 to the base of transistor 337. The emitter of transistor 337 is connected to ground through diode 338 and the collector is connected to the positive supply line through the coil 339 of the relay. The operation of the circuit may be explained as follows:

The output from photocell 38 is applied via line 40 to the base of transistor 275. This transistor operates as an emitter follower and applies the signal to the phase correcting circuit including resistors and capacitors 279 and 280, 281 and 282. This phase correction is necessary in the system both because of the phase change produced by the mechanical portion of the system and also because of the phase shift produced in the amplifier. The resultant signal is amplified by transistors 284 and 289 and applied to the emitter follower 294. From the output of the emitter follower a portion is selected by adjustment of slider potentiometer 295 and applied to the twin T network including resistors 296, 297, 298 and 299 and capacitors 302, 303 and 304. This network is designed to reject the double frequency component. That is, realizing that the output from the photocell 38 consists of a signal including at various times both the fundamental frequency equal to the frequency of scanning and higher order harmonics this filter rejects higher order harmonics of the scanning frequency particularly the double frequency and passes only the fundamental. This signal is then applied through resistor 305 to the base of transistor 306, which is an emitter follower and from thence to the base of transistor 310. Transistor 310 and transistor 313 together form a push-pull pair. The output from the collector of 310 being applied to one end of the primary transformer 317 and the output from the collector of other transistor 313 being applied to the other end of the primary of transformer 317. Due to the inter-coupling of the emitters of the two transistors variation of current in one direction in one transistor gives rise to variations of current in the opposite direction in the other transistor. Both transistors are supplied with the positive supply through the centre tap of the transformer. The resultant output appearing across terminal 322 is applied to steering motor 41 and causes it to rotate in a direction and with speed dependent upon the phase and amplitude of the fundamental frequency component appearing on conductor 40.

A signal from tachometer generator 42 is applied to terminal 323 and a selected portion is derived from the slider of potentiometer 324. This signal is applied through resistor 307 to the base of 306. As previously described with the respect to the other tachometer generators, this tachometer signal opposes the signal applied to conductor 40. As a result when a large signal appears on conductor 40 and the motor 41 is still stationary, this large signal is applied directly to motor 41 causing it to accelerate rapidly. Once the motor has accelerated, the tachometer signal is in opposition to the signal from conductor 40 and reduces the signal applied to the steering motor 41. In this way it is possible for the motor to accelerate rapidly and yet minimize the chance of overshoot since once the motor has accelerated the tachometer supplies an opposing signal to reduce the effect of the signal appearing on conductor 40.

Another portion of the signal from conductor 40 is applied through capacitor 325 to the base of transistor 326 as was previously indicated. This signal is amplified by transistor 326 and applied to the rectifying circuit comprising diodes 331 and 332. Diode 360 is a DC restorer. As long as a signal is present transistor 333 is held conductive causing the base of transistor 337 to be positive causing transistor 337 to conduct. In the event that no signal is present on conductor 40 then transistor 333 no longer conducts. The base of transistor 337 becomes more negative and transistor 337 stops conducting, thus permitting relay 339 to be de-energized, opening contacts 60. These contacts may be utilized to control various apparatus within the system such as the X and Y servo amplifiers or may be used to control other apparatus such as a valve controlling the flow of gas to the cutting torch.

Figure 7:
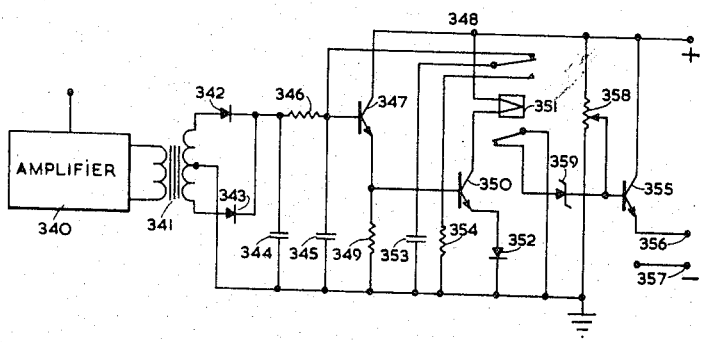

Let us now consider FIGURE 7 which is a circuit diagram for the apparatus within block 46 the speed control circuit. The signal from photocell 37 is applied to the amplifier 340 in the FIGURE 7. No description is given of this portion of the circuit since it is a standard amplifier for the frequency involved. From the amplifier an output is applied to transformer 341. The secondary of this transformer is connected to a pair of diodes 342 and 343 and the centre tap of the secondary is connected to ground. The anodes of these diodes are connected together and connected to a filter network including capacitor 344, resistor 346 and capacitor 345 and to the base of transistor 347. The collector of transistor 347 is connected to positive supply line 348 and the emitter is connected through resistor 349 to ground. The output from the emitter is applied to the base of transistor 350. The collector of transistor 350 is connected through the winding 351 of the relay to the positive supply line 348 and the emitter is connected through diode 352 to ground.

One set of contacts of the relay which consist of a single pole double throw switch has its pole connected through the capacitor 353 to ground. One contact is connected back to the base of transistor 347 and the other contact is connected through resistor 354 to ground. Another contact of this relay consist of a single pole single throw switch the pole of which is connected to ground and its single contact is connected to the zener diode 359. The other terminal of the zener diode is connected to the base of transistor 355. The base of this transistor is also connected to the slider of potentiometer 353 which connects between the positive supply line and ground.

The collector of transistor 355 is connected to the positive supply and the emitter is connected to the output terminal 356. Terminals 356 and 257 are connected to the plus and minus terminal of the sine cosine potentiometer respectively. The operation of this system will now be explained.

The signal from the photocell 37 is amplified and applied to transformer 341. The secondary of this transformer together with diodes 342, 343 constitutes a full wave rectifier system the output of which is applied to the filter network. Due to the utilization of a full wave rectifier the filter network may be simplified, and reduced in capacity thus minimizing its time delay.

If a signal is present this signal produces a DC signal on the base of transistor 347 causing this transistor to become conductive and maintaining transistor 350 conductive. The double pole switch is normally operated to connect resistor 354 to capacitor 353 thus discharging the capacitor to ground. The other contacts are opened because the relay is energized and therefore the zener diode is not connected to ground. The base of transistor 355 is therefore at a potential established by the position of the slider. Potentiometer 358 and its slider are the speed control illustrated at 45 in FIGURE 3. By adjustment of the slider of potentiometer varying voltages appear between terminals 356 and 357 and therefore varying potentials are applied to the sine cosine potentiometer which results in varying potentials being applied to the tunnel diodes which in turn produce various speeds in the X and Y servo motors.

If now the apparatus is negotiating a turn and the signal on photocell 37 suddenly disappears, no signal is applied to transformer 341 and no signal appears on the base of transistor 347. This transistor then becomes non-conductive permitting transistor 350 to cut off and relay coil 351 to be de-energized. When relay coil 351 is de-energized the double throw switch connects the capacitor 353 to the base of transistor 347. At the same time the zener diode is connected between the base of transistor 355 and ground. This zener diode then operates to limit the maximum potential which may be applied to the base. If the potential produced by the potentiometer 358 is in excess of that permitted by the zener diode the zener diode will break down causing the base of transistor 355 to be limited to a certain maximum voltage as previously indicated, established by the breakdown of potential of the zener diode 359. Therefore the potential across terminals 356 and 357 is a value as established by the speed setting of potentiometer 358 but not greater than that permitted by the zener diode 359. By a proper selection of the breakdown voltage of the diode 359 it is possible to limit the maximum speed of the X and Y drive motors. Since the signal from photocell 37 will normally only disappear on corners, the relay 351 is only de-energized when a corner is approached and the speed of the motor is only limited during cornering. When the corner has been completed and the signal once more reappears from photocell 37 this signal is applied to the base of transistor 347 through the filter network. However, the presence of capacitor 353 prohibits the immediate resumption of conduction by transistor 347. Conduction is delayed until such times as this capacitor is charged. When it has been charged then transistor 347 becomes conductive and transistor 350 becomes conductive and the circuit resumes its original condition with zener diode no longer connected to ground and capacitor 353 disconnected from the base of transistor 347 and discharged to ground through resistor 354. This particular mode of operation is useful in that it eliminates the possibility of the apparatus quickly switching from cornering to non-cornering operation. For example during the corner photocell 37 may intermittently receive a signal. However, this signal is not intended to cause the corner slowdown circuit to operate and permit full speed operation therefore the delay introduced by the presence of capacitor 353 during the slowdown condition is useful to prevent switching from one condition to the other.

During the foregoing description it has been assumed that the apparatus was operating from 110 volt AC line. Of course it will be appreciated that other sources of supply may be utilized. It is however, necessary, that there be one reference source and that this reference source be alternating current since it is necessary for the operation of the waveform generator, the scanning apparatus etc. Voltage and frequency of this source are obviously relatively unimportant since adjustments can be made to accept various voltages and adjustments of the various networks can be made to accept various frequencies. Particular reference is had here to the twin T network comprising resistors 296, 297, 298, 299, capacitors 302, 303, and 304, etc. in FIGURE 6. This network has been specially arranged to permit the quick changeover from 50 to 60 cycles by shorting out certain resistors.

It will also be appreciated that while the description has been related to particular forms of amplifiers using particular devices, many variation will be apparent to those skilled in the art.

The embodiments of the invention in which an exclusive property or privilege is claimed are defined as follows:

1. A servo system including a device to be moved along a predetermined path at a controllable velocity, at least one direct current motor coupled to said device to move said device along said path, means to produce a steering signal representative of the direction of motion required to cause said device to follow said predetermined path, an adjustable potential representative of said controllable velocity, a source of reference alternating potential, a pulse generator controlled by said alternating potential producing a train of signal polarity pulses twice the frequency of said reference potential and in fixed phase relationship thereto, a ramp function generator triggered by said pulse train producing a train of ramp waveforms of the same frequency as said train of pulses and in fixed phase relationship thereto, a second pulse generator recipient of said train of ramp waveforms and a portion of said adjustable potential determined by said steering signal to produce output pulses variable in time dependent upon said ramp waveform and said portion of said adjustable potential, a controllable rectifier controlled by the output pulses of said second pulse generator and coupling said direct current motor to a source of alternating current of the same frequency as said reference alternating potential whereby said controllable rectifier is conductive for a period during each alternation of said alternating current source as determined by the value of said portion of said adjustable potential and thereby controls the rotation of said direct current motor.

2. A servo system as claimed in claim 1 including two direct current motors, one for each co-ordinate of motion, coupled to said device to move said device along said path in a plane.

3. A servo system as claim in claim 2 wherein said adjustable potential is resolved into two co-ordinate components in accordance with said steering signal.

4. A servo system as claimed in claim 3 wherein said controllable rectifier is a pair of oppositely poled controlled semi-conductor devices.

5. A servo system as claimed in claim 4 wherein said motors are reversibly energized depending upon which of said rectifiers is conductive during particular alternations of the supply.

6. A servo system as claimed in claim 1 wherein said second pulse generator includes a tunnel diode which is biased to a predetermined level and changes its conductive state in response to the combined effect of said ramp waveform and said portion of said adjustable potential both of which are applied to said diode.

References Cited

UNITED STATES PATENTS

| | | | |
|---|---|---|---|
| 3,004,166 | 10/1961 | Greene | 318—20.155 |
| 3,105,179 | 9/1963 | Young et al. | 318—6 |
| 3,181,046 | 4/1965 | Sutton | 318—257 X |
| 3,183,372 | 4/1965 | Chin. | |
| 3,215,854 | 11/1965 | Mayhew | 307—88.5 |

BENJAMIN DOBECK, *Primary Examiner.*